US012403718B2

(12) United States Patent
Khaliq

(10) Patent No.: US 12,403,718 B2
(45) Date of Patent: Sep. 2, 2025

(54) FOLDABLE CLIPBOARD

(71) Applicant: Muhammad Sarfraz Khaliq, Brea, CA (US)

(72) Inventor: Muhammad Sarfraz Khaliq, Brea, CA (US)

( * ) Notice: Subject to any disclaimer, the term of this patent is extended or adjusted under 35 U.S.C. 154(b) by 0 days.

(21) Appl. No.: 18/409,814

(22) Filed: Jan. 11, 2024

(65) Prior Publication Data

US 2024/0140127 A1 May 2, 2024

Related U.S. Application Data

(63) Continuation-in-part of application No. 18/389,576, filed on Nov. 14, 2023, now Pat. No. 12,330,443, which is a continuation-in-part of application No. 17/685,357, filed on Mar. 2, 2022, now Pat. No. 11,850,879, and a continuation-in-part of application No. 17/555,472, filed on Dec. 19, 2021, now Pat. No. 11,872,835.

(60) Provisional application No. 63/245,804, filed on Sep. 18, 2021.

(51) Int. Cl.
*B42F 9/00* (2006.01)

(52) U.S. Cl.
CPC .............. *B42F 9/001* (2013.01); *B42F 9/002* (2013.01)

(58) Field of Classification Search
CPC ................................. B42F 9/001; B42F 9/002
See application file for complete search history.

(56) References Cited

U.S. PATENT DOCUMENTS 2,658,773 A * 11/1953 Tarris ................... A63B 55/408 24/336
12,103,328 B1 * 10/2024 Zhu ........................... B42F 1/02
2007/0187565 A1 * 8/2007 Liptan ..................... B42F 9/001 248/456

* cited by examiner

*Primary Examiner* — Kyle R Grabowski
(74) *Attorney, Agent, or Firm* — Timothy J Bortree

(57) ABSTRACT

A foldable clipboard includes at least two folding panels in which each of the folding panels cooperate to form a single planar surface when in an extended position, and each of the folding panels are configured to pivotally move to form a folded position, such that the foldable clipboard is folded into a size to fit in a pocket of a garment, or other carrying devise.

17 Claims, 11 Drawing Sheets

FOLDABLE CLIPBOARD

CROSS REFERENCE TO RELATED APPLICATIONS

The present non-provisional patent application claims the benefit of US non-provisional patent application Ser. No. 18/389,576, entitled "FOLDABLE CLIPBOARD," filed Nov. 14, 2023, which claims the benefit of U.S. non-provisional patent application Ser. No. 17/555,472, entitled "FOLDABLE CLIPBOARD," filed Dec. 19, 2021, which claims the benefit of U.S. provisional patent application No. 63/245,804, filed Sep. 18, 2021; and U.S. non-provisional patent application Ser. No. 18/389,576 entitled "FOLDABLE CLIPBOARD," filed Nov. 14, 2023, also claims the benefit of U.S. non-provisional patent application Ser. No. 17/685,357, entitled "FOLDABLE CLIPBOARD," filed Mar. 2, 2022, which claims the benefit of U.S. provisional patent application No. 63/245,804, filed Sep. 18, 2021, all of which are hereby incorporated by reference herein for all purposes.

TECHNICAL FIELD

The present invention relates to a foldable clipboard, and more particularly to a three-panel foldable clipboard in which three panels are planar relative to each other in an extended position, and at least two panels of the three panels are configured to pivotally move to overlap each other in a folded position.

BACKGROUND

Clipboards are utilized in a variety of different environments where a portable writing surface may be required. To this end, conventionally known basic clipboards generally consist of a flat panel or board and a clip mounted to one end of the board. The clip retains the writing materials or other documents being written upon against the writing surface provided by the board. Clipboards are an essential mobile writing platform that provides a flat surface for writing or drawing and which incorporates a clip device to secure a sheet of writing material. Clipboards of varying sizes and shapes are available commercially. Existing clipboards are cumbersome to carry due to their relatively large size and are inconvenient to use due to their large size. These clipboards have been restricted to merely carrying a few pages of writing material, and sometimes the pages become torn or damaged because such writing materials are unprotected on regular clipboards. These problems cause difficulty for people who, for example, but not by way of limitation, travel from one location to another, or are research scholars, physicians, healthcare workers, or those who work outside, and the like.

While some of the foregoing are alleviated by computer-based electronics, such as cell phones, computer tablets, and lap top computers, it is not always easy even when utilizing one or more of these options. Typing on cell phones and tablets is not always easy when a person is in the field. While typing can be easier on a laptop computer, they are expensive and bulky to carry into the field. Further, sun light can make the screen of any of these products difficult to see. A low technology option does not carry these problems, except for size and the ability to write an a "regular" sheet of writing material or, alternatively, an irregular sheet, such as, for example only, a standard 8.5 inch by 11-inch sheet, an A4 size sheet, an 8.5 by 14 inch sheet, and the like, of a sheet of writing material. The sheet size of, for example, an 8.5 inch by 11 inch or 8.5 by 14 inch or longer sheet of writing material makes it more difficult to easily store in one person's pocket, and the like, when in the field, such as, for example, but not by way of limitation, when checking electrical lines, sewer lines, livestock, land boundaries, or in a health care situation, as patient intake information, patient medications, patient vital signs, nursing information, physician's orders, and the like.

It would be desirable to have a low technology solution which permitted writing on a regularly sized 8.5 inch by 11 inch or longer sheet of writing material. Such a solution may carry one sheet or several sheets of writing material, and such a solution would desirably be foldable to protect the writing material (s) and prevent it/them from being crumpled and where necessary maintain the confidentiality of the information obtained on the one or more sheets of writing material, yet the solution would ideally fit within a small carrier, such as, for example only, a pocket, a purse, bag, a pack, and the like.

SUMMARY OF THE INVENTION

In one embodiment of the present invention, a foldable clipboard includes at least a first folding panel, a second folding panel, a third folding panel, and a fourth folding panel. Each folding panel is configured to cooperate to form a single planar surface when positioned in an expanded position, when a second edge of the first folding panel abuts a first edge of the second panel, a second edge of the second panel abuts a first edge of the third folding panel, and a second edge of the third folding panel abuts a first edge of the fourth folding panel. The foldable clipboard also includes a first pair of hinges, and each hinge of the first pair of hinges is positioned spaced-apart in a transverse alignment relative to each other. Each hinge of the first pair of hinges includes an outer leg bracket and an inner leg bracket that are pivotally connected together. Each respective outer leg bracket of the pair of first hinges connects to one of the first side edge and the second side edge, respectively, of the first folding panel and each respective inner leg bracket of the pair of first hinges connects to one of the first side edge and the second side edge, respectively, of the second folding panel. The foldable clipboard further includes a second pair of hinges, and each hinge of the second pair of hinges is positioned spaced-apart in a transverse alignment relative to each other. Each hinge of the second pair of hinges includes an outer leg bracket and an inner leg bracket that are pivotally connected together, and each respective outer leg bracket of the second pair of hinges connects to one of the first side edge and the second side edge, respectively, of the second folding panel and each respective inner leg bracket of the second pair of hinges connects to one of the first side edge and the second side edge, respectively, of the third folding panel. The foldable clipboard further includes a third pair of hinges, and each hinge of the third pair of hinges is positioned spaced-apart in a transverse alignment relative to each other. Each hinge of the third pair of hinges includes an outer leg bracket and an inner leg bracket that are pivotally connected together. Each respective outer leg bracket of the third pair of hinges connects to one of the first side edge and the second side edge, respectively, of the third folding panel and each respective inner leg bracket of the third pair of hinges connects to one of the first side edge and the second side edge, respectively, of the fourth folding panel. Each outer leg bracket and each inner leg bracket of the first pair of hinges, the second pair of hinges, and the third pair of hinges includes an inner side facing each other, and an outer side positioned opposite to each respective inner side. When the foldable clipboard is moved into a folded position, the inner side of each outer bracket of the first pair of hinges, the second pair of hinges, and the third pair of hinges moves over at least a portion of each outer side of each inner leg bracket of the first pair of hinges, the second pair of hinges, and the third pair of hinges.

In an aspect of the one embodiment, the foldable clipboard folds transversely relative to an axial alignment of the foldable clipboard when in the expanded position.

In another aspect of the one embodiment, when the foldable clipboard is in the folded position, the third folding panel is substantially parallel to the fourth folding panel.

In a further aspect of the one embodiment, at least one inner bracket or outer bracket of at least one hinge is connected to a flange.

In still another aspect the one embodiment, the foldable clipboard comprises a clip, the clip includes a spring-loaded clip, and the clip includes a mounting bracket connected to the foldable clipboard.

And in another aspect of the first embodiment, a pair of ends of the first folding panel are each rounded, and a pair of ends of the fourth folding panel are also each rounded.

In a further aspect of the one embodiment, the first folding panel, the second folding panel, the third folding panel, and the fourth folding panel are each constructed from at least one of metal, plastic, and cardboard.

In yet another aspect of the one embodiment, the foldable clipboard includes a writing implement holder for a writing implement.

In another embodiment of the present invention, the foldable clipboard comprises at least.

two folding panels which are configured to form a single planar surface in an expanded position of the foldable clipboard, when an edge of each panel of the at least two folding panels positioned next to each other are positioned to abut each other to provide at least a portion of an expanded position. The foldable clipboard also includes at least one pair of hinges. Each hinge of the pair of hinges is positioned spaced-apart in a transverse alignment relative to each other, and each hinge of the at least one pair of hinges includes an outer leg bracket and an inner leg bracket that are pivotally connected together, such that each outer leg bracket of each hinge of the at least one pair of hinges connects to a side edge of one panel of the at least one pair of panels, and each inner leg bracket connects to a side edge of the other panel. Each outer leg bracket and each inner leg bracket of the at least one pair of hinges includes an inner side facing each other, and an outer side positioned opposite to each respective inner side, and when the at least two panels of the foldable clipboard are moved into a folded position, the inner side of each outer bracket of the at least one pair of hinges moves over at least a portion of each outer side of each inner leg bracket of the at least one pair of hinges to provide the folded position.

In one aspect of the other embodiment, the at least two folding panels of the foldable clipboard fold transversely relative to an axial alignment of the foldable clipboard when in the expanded position.

In a further aspect of the other embodiment, the at least two folding panels are constructed from at least one of metal, plastic, and cardboard.

In yet another aspect of the other embodiment, the foldable clipboard includes a writing implement holder for a writing implement.

Also, in still a further aspect of the other embodiment, at least one outer or inner bracket of one hinge of the at least pair of hinges extends from a flange.

BRIEF DESCRIPTION OF THE DRAWINGS

The structure, operation, and advantages of the present invention will become further apparent upon consideration of the following description taken in conjunction with the accompanying figures. The figures are intended to be illustrative, and not limiting.

DETAILED DESCRIPTION OF THE PREFERRED EMBODIMENTS

Figure 1:
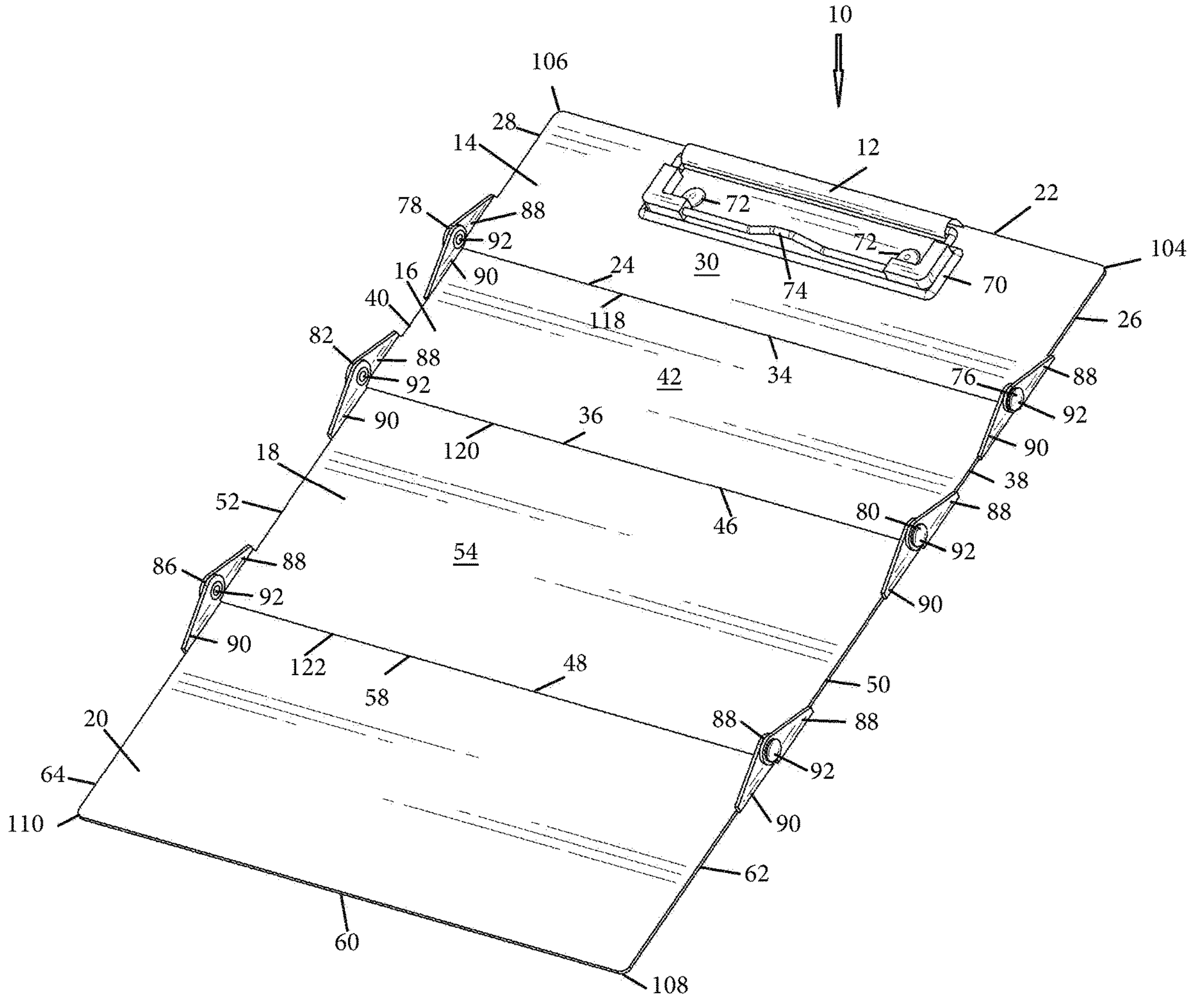
FIG. 1 is an upper surface perspective view of the foldable clipboard in an open position, according to the present invention.
Figure 2:
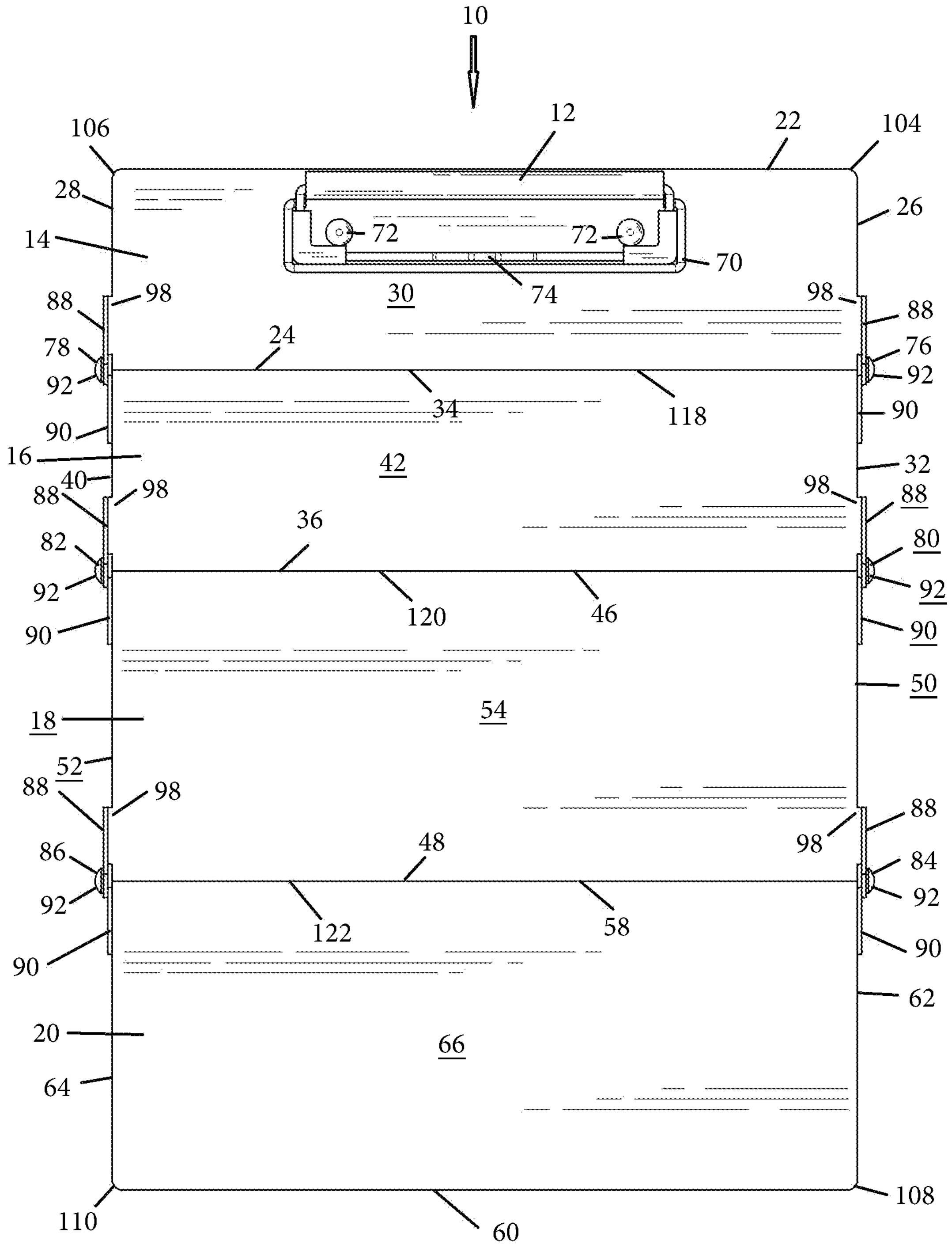
FIG. 2 is a plan view of an upper surface of the foldable clipboard of FIG. 1.
Figure 3:
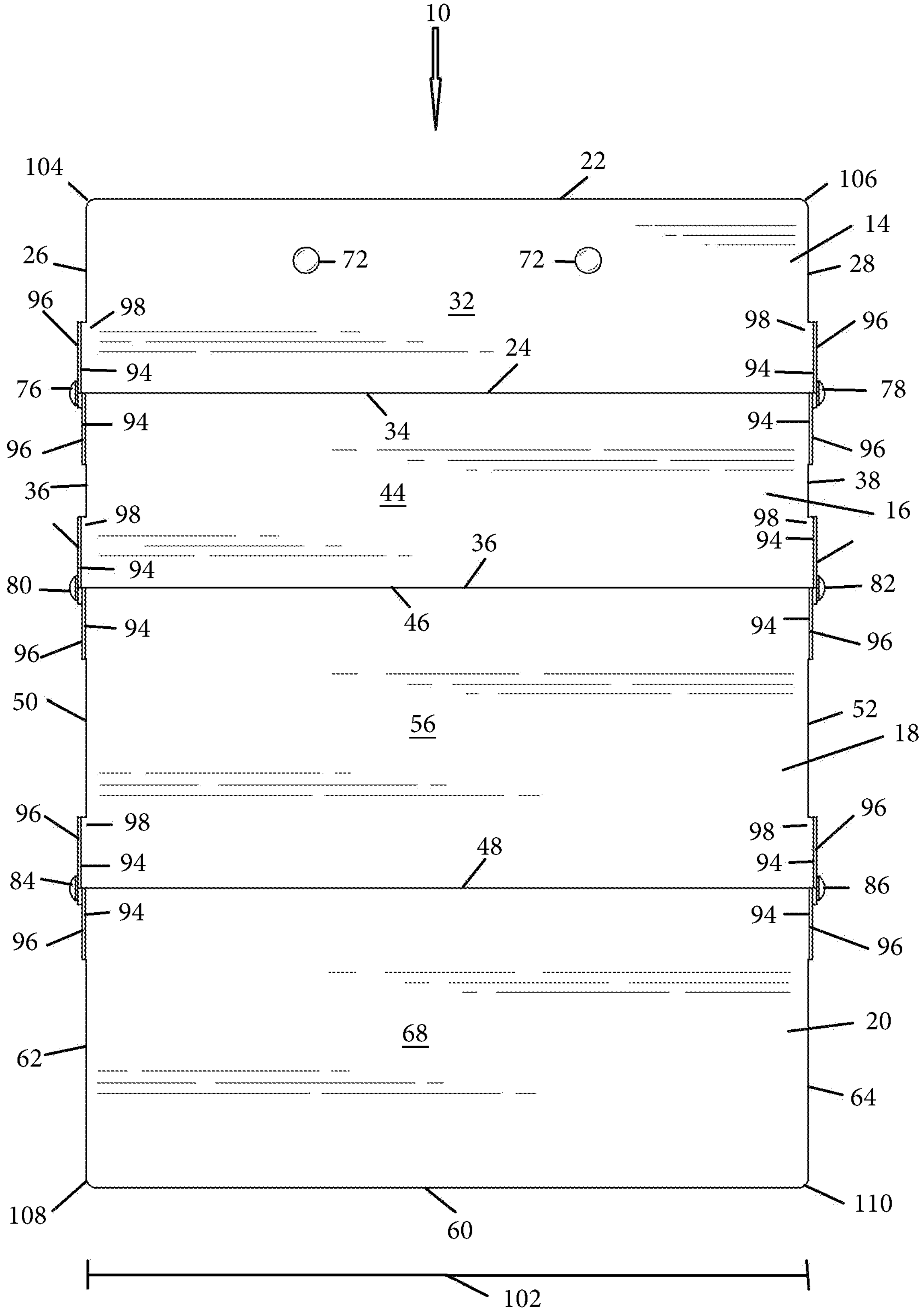
FIG. 3 is a plan view of a lower surface of the foldable clipboard of FIG. 1.
Figure 4:
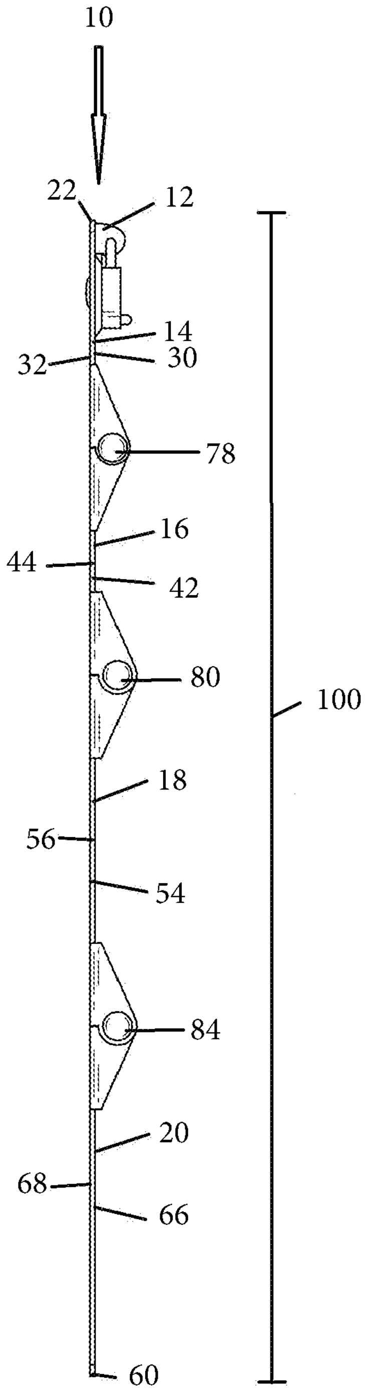
FIG. 4 is a side view of the right side of the foldable clipboard of FIG. 1.
Figure 5:
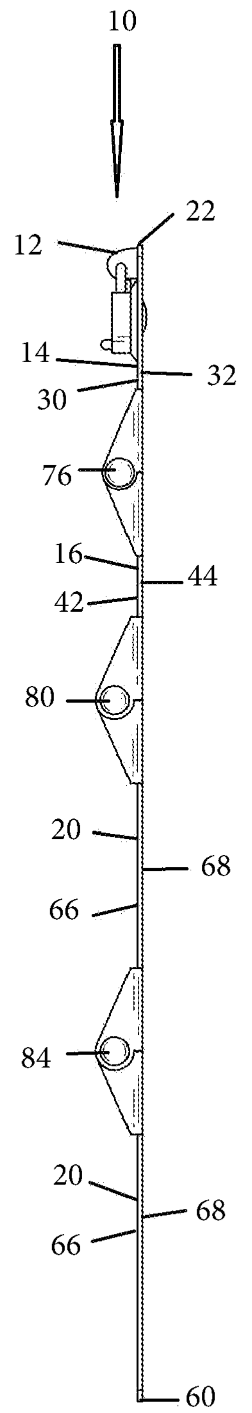
FIG. 5 is a side view of the left side of the foldable clipboard of FIG. 1.
Figure 6:
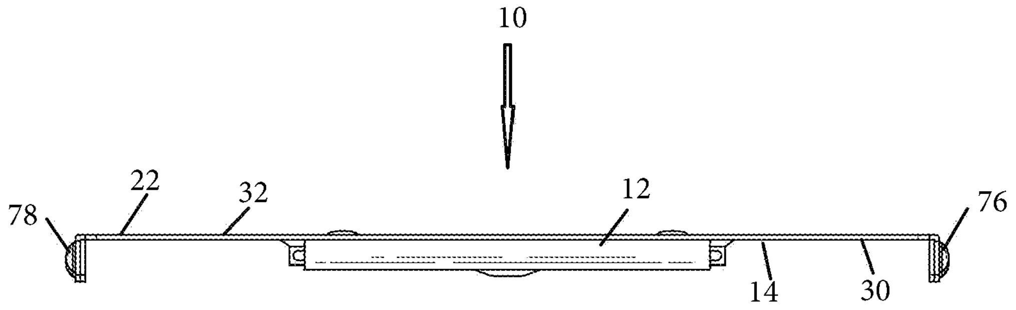
FIG. 6 is a plan view of the upper end of the foldable clipboard of FIG. 1.
Figure 7:
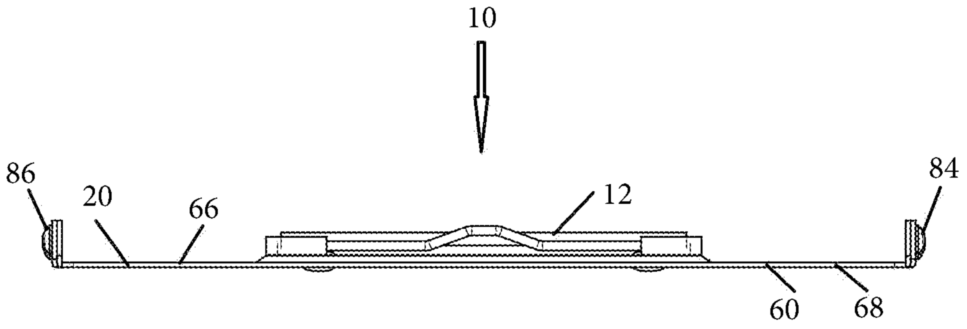
FIG. 7 is a plan view the lower end of the foldable clipboard of FIG. 1.

In the description that follows, numerous details are outlined to provide a thorough. understanding of the present invention. It will be appreciated by those skilled in the art that variations of these specific details are possible while still achieving the results of the present invention.

Exemplary illustrative embodiments of the invention should be interpreted as example(s) and non-limiting. The relationship between various components, where they are located, their composition(s), their operation, and sometimes their sizes relative to the desired operation of the invention are significant.

The foldable clipboard 10 is designed as an improvement to a traditional flat, rigid clipboard and other known clipboards. It is designated as a "mini" foldable clipboard 10 because it can be folded to a size which is reasonable to place, for example, but not by way of limitation, in a suit jacket pocket, a laboratory coat pocket, a standard coat pocket, a pants pocket, a purse, bag, pack, and the like. The foldable clipboard 10 is of particular use to doctors and medical personnel because the foldable clipboard 10 can be folded to comfortably fit into a medical coat pocket, a scrubs pocket, and even a jeans pocket. For example, the foldable clipboard 10 may be utilized to secure patient assessment forms, nursing protocols, medication lists, and all documentation in a HIPAA compliant secure foldable clipboard. However, it is within the terms of the embodiment that the foldable clipboard 10 may also be used to accommodate the needs of a variety of different people in a variety of services or work environments, as described in non-limiting examples herein.

Referring now to FIGS. 1-10, the foldable clipboard 10 desirably may include a clip 12, as well as a first folding panel 14, a second folding panel 16, a third folding panel 18, and a fourth folding panel 20. The first folding panel 14, the second folding panel 16, the third folding panel 18, and the fourth folding panel 20 are each desirably planar. Further, each panel 14, 16, 18, and 20 are also, for example, but not by way of limitation, substantially rectangular. "Substantially rectangular" as used herein, means that at least eighty-five (85) percent of the shape is rectangular, but the shape may include minor variations, such as flanges, and the like. Each panel 14, 16, 18, 20 may have different widths and/or different lengths, to enable folding and expansion of the foldable clipboard 20 in the manner shown in FIGS. 7-10. While four panels 14, 16, 18, and 20 are illustrated, it will be understood that additional or fewer panels may be utilized, as long as such a foldable clipboard 10 functions as described and shown herein.

The first folding panel 14 includes a clip 12, and the first folding panel 14 is defined by an upper edge 22 and a spaced-apart lower edge 24, a first side edge 26 spaced-apart from a second side edge 28, an upper surface 30 and a lower surface 32.

The second folding panel 16 includes an upper edge 34 and a spaced-apart lower edge 36, and a first side edge 38 spaced-apart from a second a side edge 40. The second folding panel 16 includes an upper surface 42, and a lower surface 44.

The third folding panel 18 also includes an upper edge 46, a spaced-apart lower edge 48, a first side edge 50, and a second side edge 52. The third folding panel 18 also includes an upper surface 54 and a lower surface 56.

The fourth folding panel 20 further includes an upper edge 58, a spaced-apart lower edge 60, a first side edge 62, and a second side edge 64. The fourth folding panel 20 also includes an upper surface 66 and a lower surface 68.

The clip 12 is positioned desirably and for example, but not by way of limitation, on the upper surface 30 of the first panel 14 near the upper edge 22 thereof, and may include a mechanism, i.e., a clip 12, to hold writing material (FIGS. 1-7) to the foldable clipboard 10. While one type of clip 12 is illustrated and described in detail herein, it will be appreciated that any low-profile clip which holds writing material to the foldable clipboard 10 may be used. For example, the present clip 12 may include a bracket 70 and a pair of connectors 72 which connect the bracket 70 to the foldable clipboard 10. The bracket 70 may desirably include a spring-loaded clip in the form of a handle 74 which is urged toward the foldable clipboard 10. When the handle 74 is raised, writing material may be positioned on the foldable clipboard 10 and when the handle 70 is released, the handle 70 is urged toward the foldable clipboard 10 to hold the writing material in a desired position.

The clip 12 and any part(s) thereof may be formed from metal and/or plastic. The clip 12 illustrated herein is commercially available. The clip 12 may be connected to the foldable clipboard 10 via welding, adhesives, connectors (as shown herein) or by any other manner known in the art.

A first pair of pair of hinges 76, 78, which are transversely oriented relative to each other and spaced apart connect the first folding panel 14 and the second folding panel 16 together. A second pair of hinges 80, 82, which are also transversely oriented relative to each other and spaced apart connect the second folding panel 16 and the third folding panel 18 together. And a third pair of hinges 84, 86, also transversely oriented relative to each other and spaced apart, connect the third folding panel 18 and the fourth folding panel 20 together. Each of the hinges 76, 78, 80, 82, 84, and 86 may include an outer leg bracket 88, an inner leg bracket 90, and a pin 92.

In the first pair of hinges 76, 78, each outer leg bracket 88 is connected to first and second side edges 26, 28 of the first folding panel 14, near the lower edge 24 thereof. Each inner leg bracket 90 of the first pair of hinges 76, 78, is connected to first and second side edges 38, 40, of the second folding panel 16, near the upper edge 34 thereof. Pin 92 connects each outer leg bracket 88 to each inner leg bracket and permits each inner and outer leg bracket 88, 90 and the respective panel to which it is connected to pivot.

Similarly, in the second pair of hinges 80, 82, each outer leg bracket 88 is connected to first and second side edges 38, 40 of the second folding panel 16, near the lower edge 36 thereof. Each inner leg bracket 90 of the second pair of hinges 80, 82, is connected to first and second side edges 50, 52, of the third folding panel 18, near the upper edge 46 thereof. Pin 92 connects each outer leg bracket 88 to each inner leg bracket 90 and permits each outer and inner leg bracket 88, 90 and the respective panel to which it is connected, to pivot.

In addition, in the third pair of hinges 84, 86, each outer leg bracket 88 is connected to first and second side edges 50, 52 of the third folding panel 18, near the lower edge 56 thereof. Each inner leg bracket 90 of the third pair of hinges 84, 86, is connected to first and second side edges 62, 64, of the fourth folding panel 20, near the upper edge 58 thereof. Pin 92 connects each outer leg bracket 88 to each inner leg bracket 90 and permits each inner and outer leg bracket 88, 90 and the respective panel to which it is connected, to pivot.

Each hinge 76, 78, 80, 82, 84, 86 may be, for example, but not by way of limitation, a type of knife hinge and may be formed, for example, but not by way of limitation, from metal or plastic. The hinges 76, 78, 80, 82, 84, 86 may be integrally formed with each panel 14, 16, 18, and 20 as shown and described herein, and the pivot pin 92 may be added to each hinge later. Alternatively, each hinge 76, 78, 80, 82, 84, 86 may be connected to panels 14, 16, 18, and 20 as shown and described in detail herein by welding, adhering, connecting via connectors, and all other forms of connection known and commercially available. Varying a position of any hinge 76, 78, 80, 82, 84, 86 on a side edge and/or surface of a panel is also enabled herein, as is a variation of size and/or spacing of any hinge.

Figure 8:
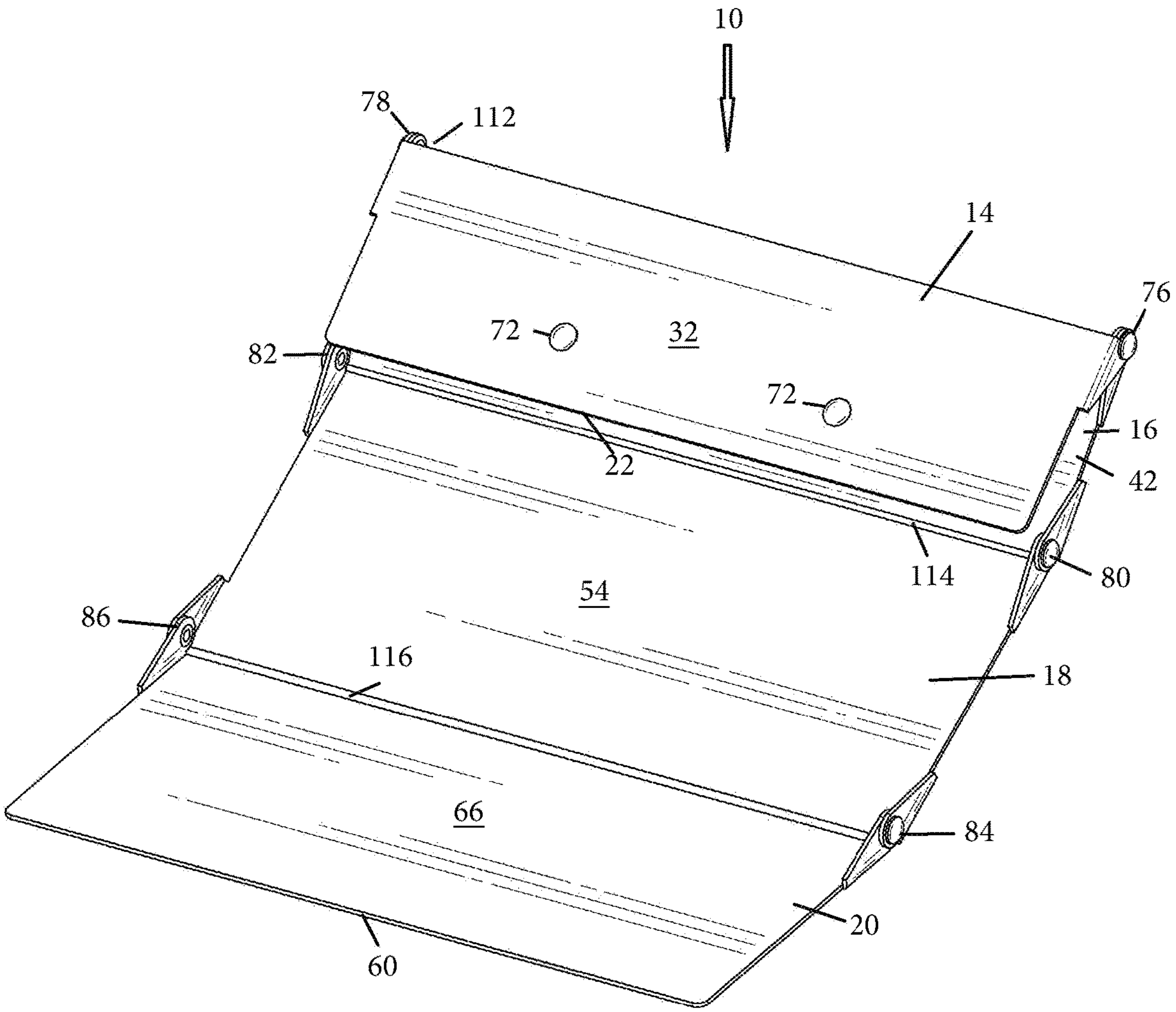
FIG. 8 is a perspective view of the first folding panel of the foldable clipboard folded over and overlapping the second folding panel of the foldable clipboard.
Figure 9:
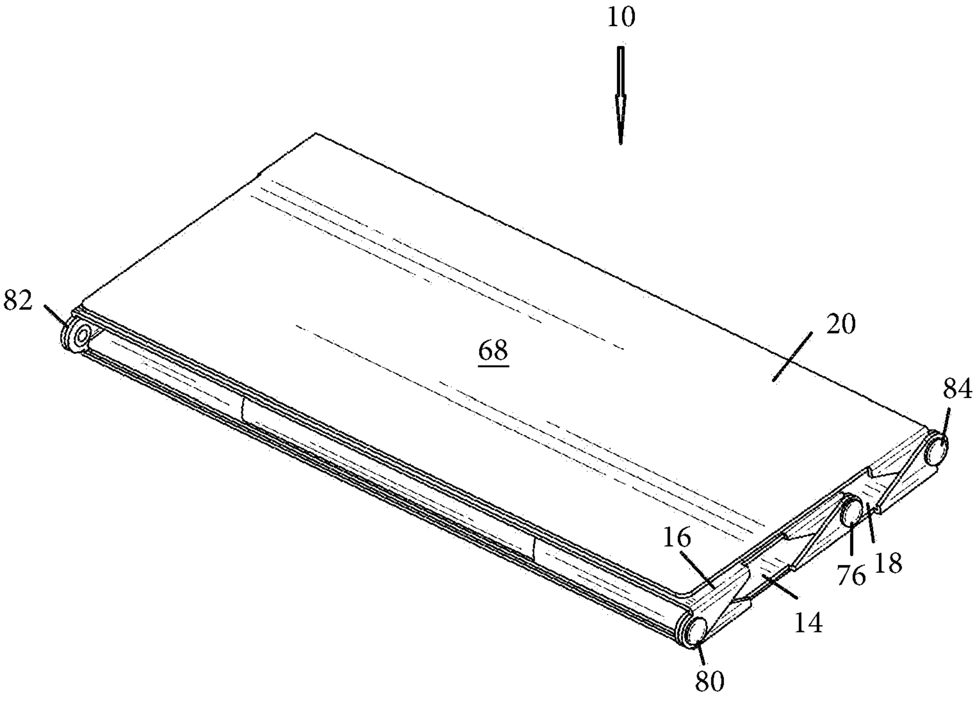
FIG. 9 is a perspective view of the foldable clipboard in the completely folded position.
Figure 10:
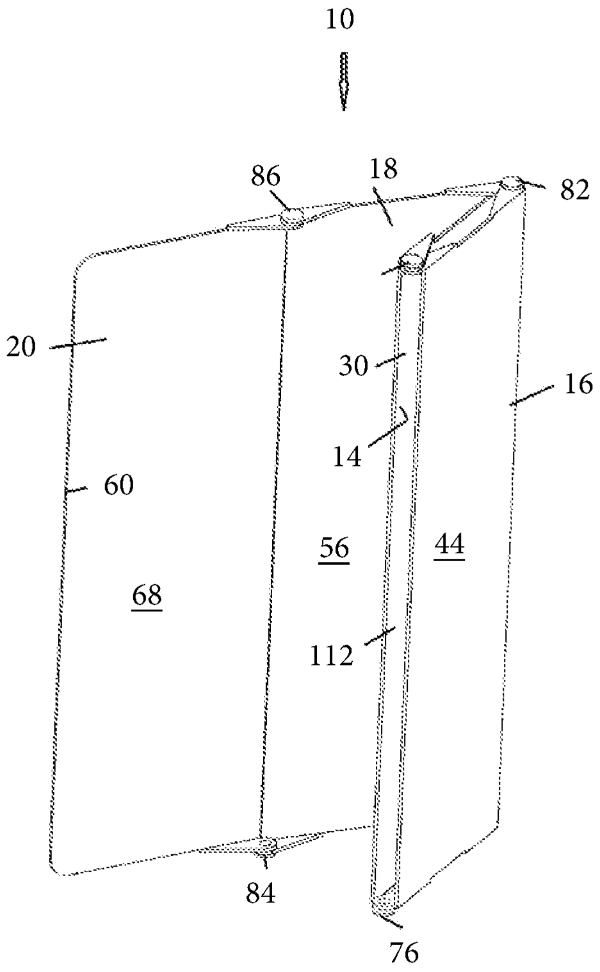
FIG. 10 is a perspective view of the first and second folding panels moved to fold over and overlap the third folding panel, while the fourth folding panel is moving to fold over and overlap the second folding panel.

Referring to FIGS. 8-10, each hinge 76, 78, 80, 82, 84, 86, respectively is formed to permit each inner leg bracket 90 thereof, respectively, to be overlapped by each outer leg bracket 88 thereof, respectively. Each location and each connection of each hinge 76, 78, 80, 82, 84, 86 is configured to enhance the ability of the foldable clipboard 10 to fold as shown and described herein. It will be understood that changes in locations of hinges may result in different folding patterns.

Each outer leg bracket 88 and each inner leg bracket 90 of each hinge 76, 78, 80, 82, 84, 86, respectively, is connected to the foldable clipboard 10 along an inner surface 94 of each inner leg bracket 90, and each outer leg bracket 88, of each respective hinge 76, 78, 80, 82, 84, 86. Each outer leg bracket 88 and/or each inner leg bracket 90 may include, or be position upon, a small flange 98 (formed on at least one side edge of one or more panels) and may permit the connection of the outer leg brackets 88 to their respective panels, so that each outer leg bracket 88 can overlap its respective inner leg bracket 90 to permit an expanded position and a folded position of the foldable clipboard 10, as illustrated in FIG. 10.

Referring to FIGS. 1 and 8-10, in a method of use, to move the foldable clipboard 10 from the expanded position illustrated in FIGS. 1-7 to a folded position, the first folding panel 14 is positioned to overlap a surface of the second folding panel 16, as shown in FIG. 8, then the second folding panel 18 is moved so that one surface of the first folding panel 14 is positioned to overlap a surface of the third folding panel 18, as illustrated in FIG. 9, leaving the fourth folding panel 20 to overlap a surface of the second folding panel 16, as shown in FIG. 10, therefore moving the foldable clipboard 10 from the expanded position to the folded position. The foldable clipboard 10 is folded such that a surface of the fourth folding panel 20 and a surface of the third folding panel 18 are positioned to provide opposing outer surfaces of the foldable clipboard 10 that are desirably, but not by way of limitation, substantially parallel relative to each other, as shown in FIG. 10. Based on a location of the hinges on each folding panel, it will be understood that other folding configurations are possible, and they are therefore hereby enabled.

Referring to FIGS. 1-7, it will be understood that the foldable panels 14, 16, 18, and 20 of the foldable clipboard 10 cooperate to form a single flat, planar surface in the expanded position which is rigid and suitable for securing documents (not shown) and/or providing a writing surface to hold writing material (not shown) thereupon. In this configuration, a person can easily hold and write on the planar surface thereon. When in the extended position, it will be appreciated that the lower edge 24 of first folding panel 14 abuts the upper edge 34 of the second panel 16. And the upper edge 46 of the third folding panel 18 abuts the lower edge 36 of the second panel 16, while the lower edge 48 of the third folding panel 18 abuts the upper edge 58 of the fourth folding panel 20 to form the planar expanded position of the foldable clipboard 10.

When the foldable clipboard 10 is moved into the folded position, the foldable clipboard 10 naturally hides any writing materials it is holding, thus helping maintain confidentiality when it is desired, while also protecting the writing material from damage. And, when in the folded position, the foldable clipboard 10 may be positioned in a pocket, a purse, a briefcase, a pack, and the like.

The foldable clipboard 10 may be constructed of any suitable rigid material, such as cardboard, metal, plastic, and combinations thereof. In particular, but not by way of limitations, aluminum provides a very strong, lightweight material that is very durable. Alternatively, plastic also provides a strong and lightweight material that is relatively inexpensive to manufacture. The foldable clipboard 10 may have any desired dimensions which will hold a standard writing material, such as, for example only, an 8.5 inch by 11 inch or an 8 inch by 14-inch sheet of writing material. Alternatively, each folding panel 14, 16, 18, 20 may carry one or more sheets of writing material or a size similar to the size of each panel which carries the sheet, when the foldable clipboard is in the expanded position. For example, but not by way of limitation, the foldable clipboard 10 may have a length 100 of 12 inches and a width 102 of 8.5-9 inches, or alternatively, a length of 15 inches and a width of 9-10 inches. The depth 104 or thickness of the foldable clipboard 10 may range from 0.5 millimeter to 5 millimeters. It will be understood that other lengths, depths, and widths of the foldable clipboard 10 are possible, so long as the foldable clipboard 10 operates as shown and described in detail herein, and includes the advantages shown and described herein.

Each folding panel 14, 16, 18, 20 of the foldable clipboard 10, desirably is generally rectangular, and may be configured to be substantially rectangular in shape. However, as illustrated herein in FIGS. 1-10, one or more folding panels 14, 16, 18, 20 may include alternative dimensions. For example, the first folding panel 14 may have a narrower width than the second folding panel 16, which may have a narrower width than the third folding panel 18, and so forth. Further, each folding panel 14, 16, 18, 20 may have a varying length, to accommodate the folded position of the foldable clipboard 10. For example, the third and fourth folding panels 18, 20 may have a slightly longer length to accommodate the folded position of the foldable clipboard 10. As noted previously, one or more of the folding panels 14, 16, 18, 20 may include one or more flanges 98 which may support a hinge. Rather than an extended length of the panels, such a flange 98 may be useful in accommodating the folded position as well. In addition, the first folding panel 14 may have rounded outer corners 104, 106, and the fourth folding panel 20 may also have rounded corners 108, 110. Each rounded corner 104, 106, 108, 110 may have, for example, but not by way of limitation, a slope that may desirably be about a 30-degree slope. The rounded edges are advantageous in allowing the foldable clipboard 10 to smoothly store in a pocket or other enclosure.

When the foldable clipboard 10 is moved into the folded position, as illustrated in FIGS. 8-10, a first space 112 opens between the first folding panel 14 and the second folding panel 16 and a second space 114 opens between the second folding panel 16 and the third folding panel 18 when the second folding panel 16 (carrying the overlapped and first folding panel 14) is positioned over the third folding panel 18 (i.e., with a surface of the first folding panel 14 positioned next to a surface of the third folding panel 18). When the fourth folding panel 20 is folded over a surface of the second folding panel 16, a third space 116 opens between the third folding panel 18 and the fourth folding panel 20. The external folding panels of the foldable clipboard in the folded position a surface of the third folding panel 18 opposite a surface of the fourth folding panel 20. Desirably, in the folded position, the external surfaces of the third and fourth folding panels 18, 20, are substantially parallel. However, it will be understood that this desired "substantial parallel" alignment may vary somewhat based upon a thickness of the writing material(s) held on the foldable clipboard 10. Therefore, as used herein, "substantially parallel," as used herein means within a range of between 0 degrees and 5 degrees of an angle or alignment.

When the foldable clip board 10 is in the planar expanded position, the first folding panel 14, the second folding panel 16, the third folding panel 18, and the fourth folding panel 20 cooperate together with the hinges 76, 78, 80, 82, 84, 86 to form a first stop 118 which is formed between the lower edge 24 of the first folding panel 14 and the upper edge 34 of the second folding panel 16 abut each other in the expanded position, to assist in holding the first folding panel 14 and the second folding panel 16 in the planar expanded position. Similarly, a second stop 120 is formed between the lower edge 36 of the second folding panel 16 and the upper edge 46 of the third folding panel 18 which abut each other in the expanded position, to assist in holding the second folding panel 16 and the third folding panel 18 in the planar expanded position. Further, a third stop 122 is formed between the lower edge 48 of the third folding panel 18 and the upper edge 58 of the fourth folding panel 20 which abut each other in the expanded position, to assist in holding the third folding panel 18 and the fourth folding panel 20 in the planar expanded position.

While the clip 12 is positioned on an upper surface 30 of the first folding panel 14, it will be understood that the clip 12 is excluded from the consideration of the planar expanded position, and the clip 12 is desirably a low-profile clip as illustrated or could be formed partially or totally within the first folding panel 14 to more closely conform to the planar formation of the foldable clipboard 10 (not shown). Alternatively, the clip 12 could be provided separately and attached to any portion of the foldable clipboard 10 by any means known in the art and commercially available. In yet another alternative, the foldable clipboard 10 may be provided without a clip.

Figure 11:
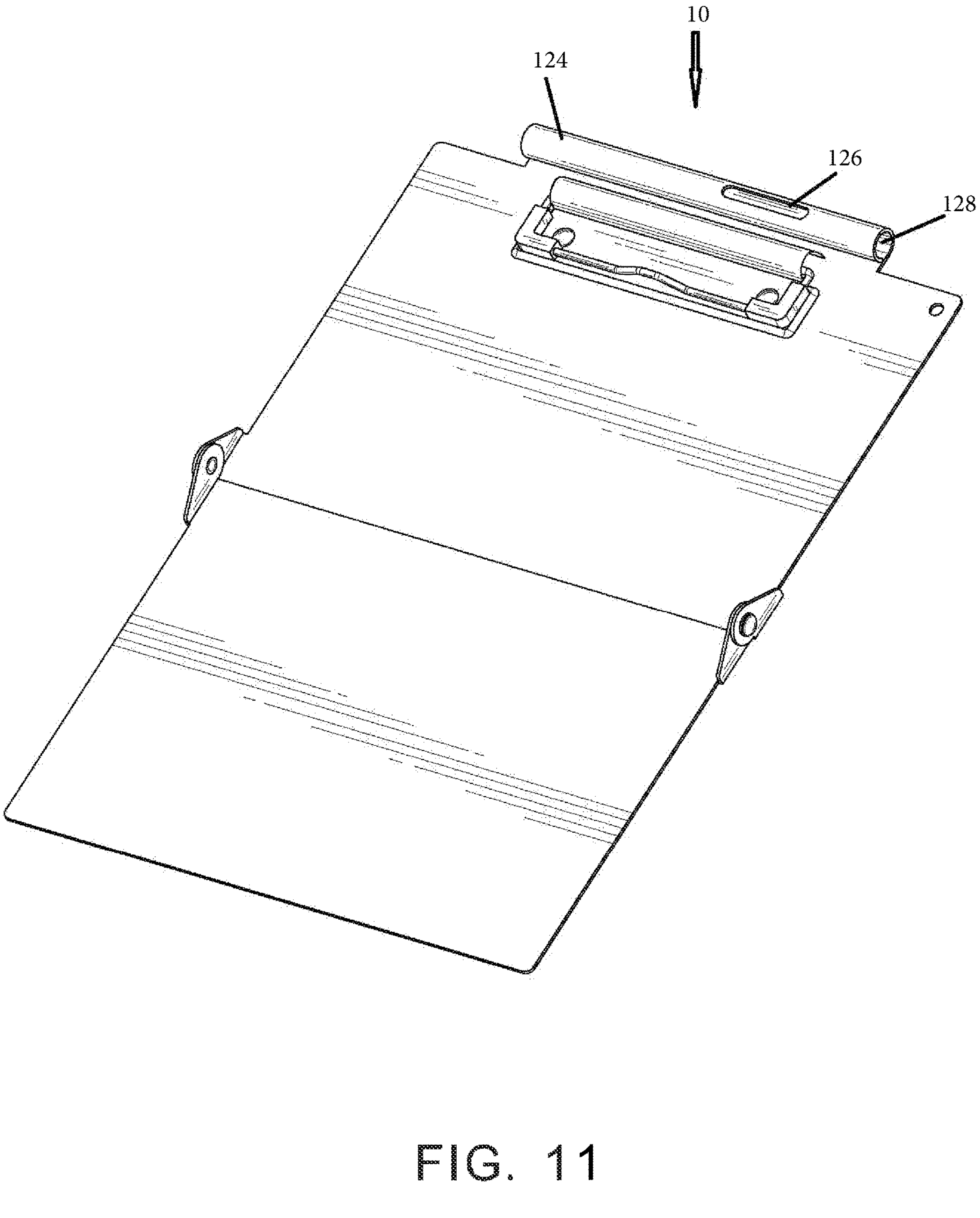
FIG. 11 is a perspective view of an alternative foldable clipboard similar to FIG. 1 but showing one writing implement holder configured to hold a writing implement carried by the foldable clipboard.

The foldable clipboard 10 may include additional features, including one shown in FIG. 11, which illustrates one writing implement holder 124 for a pencil, pen, and the like (not shown) connected to an alternative foldable clipboard 10*a*. In this non-limiting example, the writing implement holder 124 is cylindrically shaped with an opening 126 formed through at least a portion of the holder 124 configured to hold a writing implement. The holder 124 also includes an opening or window 128, to permit a user of the foldable clipboard to see if a writing implement is currently held within the holder 124. In the present example shown in FIG. 11, the holder 124 is formed as a part of the foldable clipboard 10, along an edge of a panel, in this example, the first folding panel 14. However, it will be appreciated that any writing implement holder of any configuration which is known and commercially available may be utilized and connected to or formed with any portion of the foldable clipboard 10, so long as the foldable clipboard 10 operates as shown and described herein.

Although the invention has been shown and described concerning a certain preferred embodiment or embodiments, certain equivalent alterations and modifications will occur to others skilled in the art upon the reading and understanding of this specification and the annexed drawings. In particular regard to the various functions performed by the above-described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed concerning only one of several embodiments, such feature may be combined with one or more features of the other embodiments as may be desired and advantageous for any given or particular application.

What is claimed is:

1. A foldable clipboard, comprising:

at least a first folding panel, a second folding panel, a third folding panel, and a fourth folding panel, each folding panel configured to cooperate to form a single planar surface when positioned in an expanded position, such that a second edge of the first folding panel abuts a first edge of the second panel, a second edge of the second panel abuts a first edge of the third folding panel, and a second edge of the third folding panel abuts a first edge of the fourth folding panel;

a first pair of hinges, each hinge of the first pair of hinges positioned spaced-apart in a transverse alignment relative to each other, each hinge of the first pair of hinges including an outer leg bracket and an inner leg bracket that are pivotally connected together, wherein each respective outer leg bracket of the first pair of hinges connects to one of the first side edge and the second side edge, respectively, of the first folding panel and each respective inner leg bracket of the first pair of hinges connects to one of the first side edge and the second side edge, respectively, of the second folding panel;

a second pair of hinges, each hinge of the second pair of hinges positioned spaced-apart in a transverse alignment relative to each other, each hinge of the second pair of hinges including an outer leg bracket and an inner leg bracket that are pivotally connected together, wherein each respective outer leg bracket of the second pair of hinges connects to one of the first side edge and the second side edge, respectively, of the second folding panel and each respective inner leg bracket of the second pair of hinges connects to one of the first side edge and the second side edge, respectively, of the third folding panel;

a third pair of hinges, each hinge of the third pair of hinges positioned spaced-apart in a transverse alignment relative to each other, each hinge of the third pair of hinges including an outer leg bracket and an inner leg bracket that are pivotally connected together, wherein each respective outer leg bracket of the third pair of hinges connects to one of the first side edge and the second side edge, respectively, of the third folding panel and each respective inner leg bracket of the third pair of hinges connects to one of the first side edge and the second side edge, respectively, of the fourth folding panel;

wherein each outer leg bracket and each inner leg bracket of the first pair of hinges, the second pair of hinges, and the third pair of hinges includes an inner side, and an outer side, the inner sides of the outer leg brackets of the first pair of hinges facing each other and each facing a respective one of the outer sides of the inner leg brackets of the first pair of hinges, the inner sides of the outer leg brackets of the second pair of hinges facing each other and each facing a respective one of the outer sides of the inner leg brackets of the second pair of hinges, the inner sides of the outer leg brackets of the third pair of hinges facing each other and each facing a respective one of the outer sides of the inner leg brackets of the third pair of hinges, wherein when the foldable clipboard is moved into a folded position, as to each hinge in the first pair of hinges, the inner side of the outer bracket of the hinge pivotally moves over the outer side of the inner bracket of the hinge such that the outer bracket overlaps the inner bracket, and as to each hinge in the second pair of hinges, the inner side of the outer bracket of the hinge pivotally moves over the outer side of the inner bracket of the hinge such that the outer bracket overlaps the inner bracket, and as to each hinge in the third pair of hinges, the inner side of the outer bracket of the hinge pivotally moves over the outer side of the inner bracket of the hinge such that the outer bracket overlaps the inner bracket, and wherein each of the outer brackets is visibly in front of a respective cooperating one of the inner brackets when the clipboard is in a folded position.

2. The foldable clipboard of claim 1, wherein each of the first, second, third and fourth folding panels folds transversely relative to an axial alignment of the foldable clipboard when in the expanded position.

3. The foldable clipboard of claim 1, wherein when in the folded position, the third folding panel is substantially parallel relative to the fourth folding panel.

4. The foldable clipboard of claim 1, at least one inner bracket or outer bracket of at least one hinge is connected to a flange.

5. The foldable clipboard of claim 1, further comprising a clip.

6. The foldable clipboard of claim 5, wherein the clip is a spring-loaded clip.

7. The foldable clipboard of claim 5, wherein the clip includes a mounting bracket connected to a surface of the foldable clipboard.

8. The foldable clipboard of claim 1, wherein a pair of ends of the first folding panel are each rounded, and a pair of ends of the fourth folding panel are each rounded.

9. The foldable clipboard of claim 1, wherein the first folding panel, the second folding panel, the third folding panel, and the fourth folding panel are constructed from at least one of metal, plastic, and cardboard.

10. The foldable clipboard of claim 1, wherein the clipboard includes a writing implement holder for a writing implement.

11. A foldable clipboard, comprising:

at least two folding panels which are configured to form a single planar surface when positioned in an expanded position such that an edge of each panel of the at least two folding panels positioned next to each other is positioned to abut an adjacent edge to provide at least a portion of the planar surface;

at least one pair of hinges, each hinge of the pair of hinges positioned spaced-apart in a transverse alignment relative to each other, each hinge of the at least one pair of hinges including an outer leg bracket and an inner leg bracket that are pivotally connected together, such that each outer leg bracket of each hinge of the at least one pair of hinges connects to and extends away from a side edge of one panel of the at least two folding panels, and wherein each inner leg bracket connects to a side edge of the other panel of the at least two folding panels;

wherein each outer leg bracket and each inner leg bracket of the at least one pair of hinges includes an inner side, and an outer side, the inner sides of the outer leg brackets of the at least one pair of hinges facing each other and each facing a respective one of the outer sides of the inner leg brackets of the at least one pair of hinges, the inner sides of the outer leg brackets of the at least one pair of hinges facing each other and each facing a respective one of the outer sides of the inner leg brackets of the at least one pair of hinges, wherein when foldable clipboard is moved into a folded position, as to each hinge in the at least one pair of hinges, the inner side of the outer bracket of the hinge pivotally moves over the outer side of the inner bracket of the hinge such that the outer bracket overlaps the inner bracket, and as to each hinge in the at least one pair of hinges, the inner side of the outer bracket of the hinge pivotally moves over the outer side of the inner bracket of the hinge such that the outer bracket overlaps the inner bracket.

12. The foldable clipboard of claim 11, wherein the at least two folding panels of the foldable clipboard fold transversely relative to an axial alignment of the foldable clipboard when in the expanded position.

13. The foldable clipboard of claim 11, further comprising a clip.

14. The foldable clipboard of claim 11, wherein the folding panels are constructed from at least one of metal, plastic, and cardboard.

15. The foldable clipboard of claim 11, wherein the clipboard includes a writing implement-holder for a writing implement.

16. The foldable clipboard of claim 11, wherein at least one outer or inner bracket of one hinge of the at least one pair of hinges extends from a flange.

17. The foldable clipboard of claim 11, wherein each of the outer brackets is visibly in front of a respective cooperating one of the inner brackets when the clipboard is in a folded position.

* * * * *